(12) United States Patent
Plouraboue et al.

(10) Patent No.: US 7,337,598 B2
(45) Date of Patent: Mar. 4, 2008

(54) LAWN MOWER

(75) Inventors: Tommy Plouraboue, Ormes-Loire (FR); Dominique Vougier, Ormes-Loire (FR); Guillaume Vizzutti, Ormes-Loire (FR)

(73) Assignee: Honda Motor Co., Ltd. (JP)

( * ) Notice: Subject to any disclaimer, the term of this patent is extended or adjusted under 35 U.S.C. 154(b) by 373 days.

(21) Appl. No.: 11/188,541

(22) Filed: Jul. 25, 2005

(65) Prior Publication Data

US 2006/0042213 A1   Mar. 2, 2006

(30) Foreign Application Priority Data

Sep. 2, 2004   (JP)   ............................. 2004-255798

(51) Int. Cl.
*A01D 69/08*   (2006.01)
(52) U.S. Cl. ....................... 56/11.8; 56/11.7; 56/DIG. 6
(58) Field of Classification Search ............. 56/10.2 R, 56/10.8, 11.1, 11.3, 11.5–11.8, 12.6, 17.6, 56/DIG. 6
See application file for complete search history.

(56) References Cited

U.S. PATENT DOCUMENTS

| 4,335,566 | A | * | 6/1982 | Hurd | ............................ 56/11.8 |
| 4,367,813 | A | * | 1/1983 | Wieland et al. | ............ 192/17 R |
| 4,428,180 | A | * | 1/1984 | Carlson | ........................ 56/11.3 |
| 4,614,130 | A | * | 9/1986 | Heismann et al. | ...... 74/501.5 R |
| 4,833,935 | A | * | 5/1989 | Roelle | ........................ 74/483 R |
| 4,850,182 | A | * | 7/1989 | Barnard et al. | .............. 56/10.8 |
| 4,932,192 | A | * | 6/1990 | Ishimaru | ....................... 56/11.8 |

FOREIGN PATENT DOCUMENTS

JP   6033785   8/1981

* cited by examiner

*Primary Examiner*—Thomas B. Will
*Assistant Examiner*—Alicia Torres
(74) *Attorney, Agent, or Firm*—Adams & Wilks

(57) ABSTRACT

A mowing machine having a lock mechanism for locking the engagement of a clutch mechanism is disclosed. By a two-motion control operation of operating a clutch lever and then operating a lock lever of a lock mechanism, a locking state of the lock mechanism is released. This releasing of the locking mechanism immediately causes the clutch mechanism to engage, so that there is almost no half-clutch state.

2 Claims, 16 Drawing Sheets

LAWN MOWER

FIELD OF THE INVENTION

This invention relates to a lawn mower, and particularly to a lawn mower having improved operation of a lock mechanism of when a clutch mechanism for clutch-controlling motive power to a cutter blade is operated to engage or disengage.

BACKGROUND OF THE INVENTION

Lawn mowers having a clutch mechanism for clutch-controlling motive power transmission and having a control lever (clutch lever) for operating the clutch mechanism are in use. Lawn mowers of this kind are provided with a safety lock mechanism so that it is not possible to operate the control lever unintentionally.

A lawn mower having a clutch lever provided with a lock mechanism so that it is not possible to operate the clutch lever unless the lock mechanism is released is proposed for example in JP-UM-B-60-33785. This lawn mower will be described on the basis of FIG. 16 and FIG. 17.

As shown in FIG. 16, a lawn mower 200 has an engine 202 mounted on a cutter housing 201. A cutter blade 204 for cutting grass is connected to the engine 202 via a clutch mechanism 203. A handle 205 extends rearward from the cutter housing 201. A control lever (clutch lever) 206 for engaging and disengaging the clutch mechanism 203 is mounted on the handle 205 via a support bracket 208.

As shown in FIG. 17, the operating lever 206 has a lock mechanism 207 for locking its movement in an initial state. The lock mechanism 207 is made up of a lock piece 209, having its center pivotally attached to the support bracket 208, for locking the operating lever 206 with one end thereof, a tension spring 211 passing between the other end of this lock piece 209 and the support bracket 208; and a release lever 212, attached to the lock piece 209, for releasing the first end of the lock piece 209 from the support bracket 208. The lock mechanism 207 locks the operating lever 206 pivotally attached to the support bracket 208 in a predetermined state.

That is, the lawn mower 200 shown in FIG. 16, by having the operating lever (main operating part) 206 and the release lever (auxiliary operating part) 212, is of a type such that the clutch mechanism 203 is operated with two motions, and is constructed so that it is not possible to engage the clutch mechanism 203 and rotate the cutter blade 204 with one continuous movement of the operating lever 206.

However, in the lawn mower 200 of related art, the operating lever 206 is brought to an operable state with the release lever 212 and the clutch mechanism 203 is engaged with the operating lever 206, and this engaging operation of the clutch mechanism 203 depends on the sense of the operator. That is, sometimes a half-clutch state is continued for a long time when the operating lever 206 is moved. And as a result there has been the problem that the clutch mechanism 203 wears and the life of the clutch mechanism 203 becomes short.

The lock piece 209 is released by pushing the release lever 212. When engaging the clutch mechanism 203, it is necessary to operate the operating lever 206 so as to shift it toward the handle 205 while pushing the release lever 212. Consequently, it sometimes happens that an attempt is made to shift the operating lever 206 with the release lever 212 uncertainly pushed, there is uncertainty in the engagement control of the clutch mechanism 203, and there has been the shortcoming that the controllability of the engagement control of the clutch mechanism 203 is poor.

Accordingly, a lawn mower has been needed with which, as well as it being possible to control the clutch mechanism with two motions, dependence of the engagement operation of the clutch mechanism on the sense of the operator is avoided, and it is possible to make the clutch engagement control certain. That is, a lawn mower has been awaited with which it is possible to keep the engagement operation of the clutch mechanism to a fixed timing and it is possible to carry out a two-motion control operation.

SUMMARY OF THE INVENTION

The present invention provides a lawn mower made up of a cutter blade for cutting grass; a clutch mechanism for transmitting or cutting off power from an engine to the cutter blade; a clutch lever for remotely controlling the clutch mechanism via a cable; and a lock mechanism for barring a clutch-engaging function of the clutch lever, the lock mechanism having a first slide member interposed between the cable and the clutch lever and connected to the cable side, a second slide member connected to the clutch lever side, a tension spring interposed between the first and second slide members, a catch member for holding the first slide member in a predetermined position or releasing it from the predetermined position, a cam member for moving the catch member, and a lock lever for actuating the cam member.

In the invention, dependence of the engagement operation of the clutch mechanism on the sense of the operator is removed from the engagement control operation, and a two-motion control operation with which it is possible to keep the engagement operation of the clutch mechanism to a fixed timing is made possible. That is, the clutch mechanism is brought to an ON state by the two-motion control operation of operating the clutch lever and then operating the lock lever.

As a result, it is possible to eliminate a movement of continuing a half-clutch state for a long time when the clutch lever is moved toward the handle, and wearing of the clutch mechanism can be prevented. By this means it is possible to make the engagement control of the clutch mechanism certain and to extend the life of the clutch mechanism.

The cam member preferably consists of a cam part formed on the lock lever.

BRIEF DESCRIPTION OF THE DRAWINGS

A number of preferred embodiments of the invention will be described below in detail on the basis of the accompanying drawings, in which.

DETAILED DESCRIPTION OF THE PREFERRED EMBODIMENTS

Figure 1:
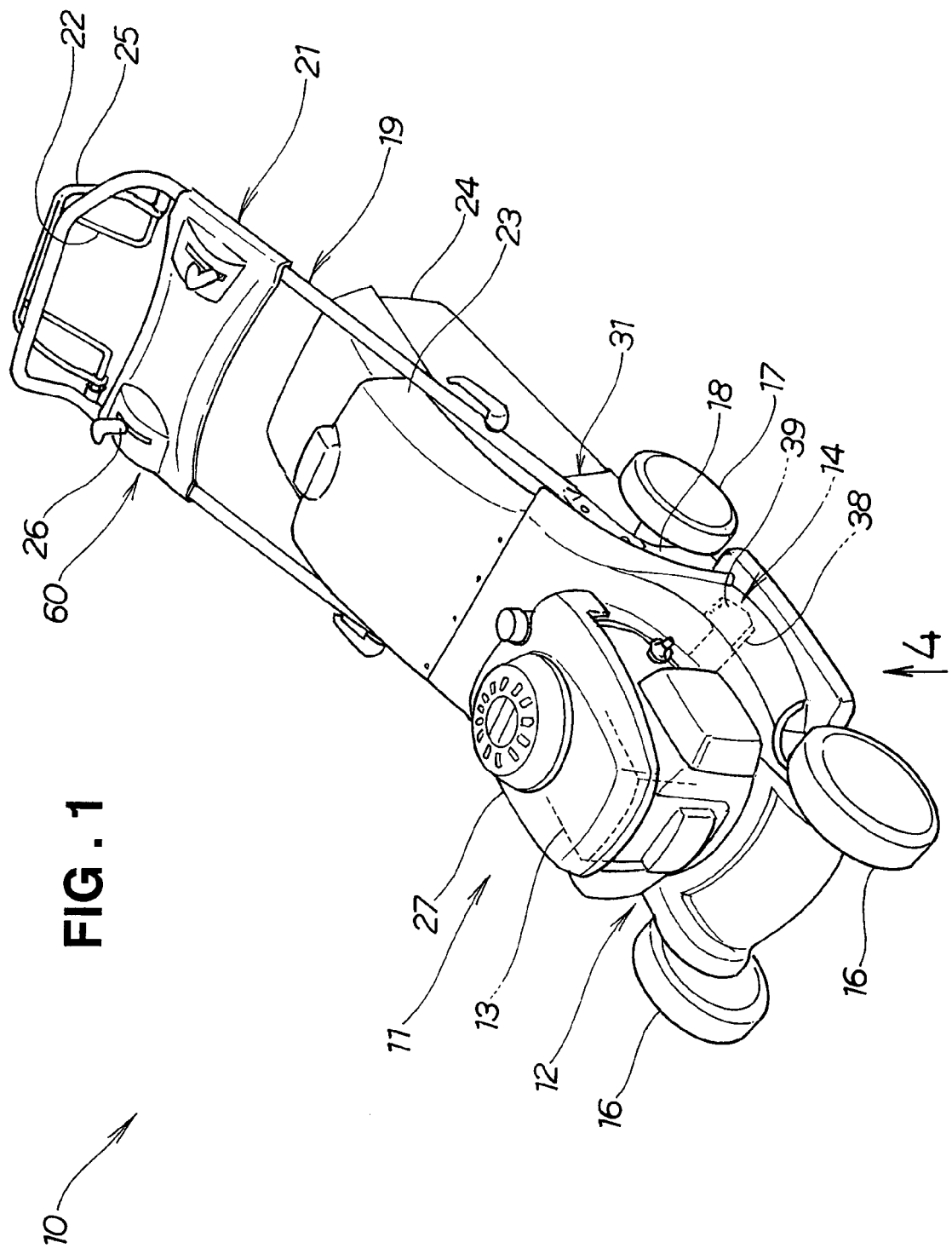
FIG. 1 is a perspective view of a lawn mower to which a lock mechanism according to the invention has been applied.

A lawn mower 10 constituting a preferred embodiment of the invention shown in FIG. 1 is of a self-propelling type. A cutter blade 14 for cutting grass is rotated by an engine 13, which is a motive power source. Cut grass is collected by being carried from a cutter housing 12 by a carrying draft into a grass bag 24. Rear wheels 17 are driven by the engine 13.

In the figure, the reference number 11 denotes a machine body; 16 front wheels; 18 handle stays; 19 a handle; 21 a handle cover extending across the handle 19; 22 a clutch lever for travel, which clutch-controls motive power transmission from the engine 13 to the rear wheels 17; 23 a grass cover; 25 a clutch lever for clutch-controlling rotational power to the cutter blade 14; 26 a lock lever; 27 a head cover; and 60 a lock mechanism.

The clutch lever 25 is a lever that simultaneously performs an operation of applying a brake to the cutter blade 14 while stopping the driving of the cutter blade 14, and is sometimes called a BBC control lever because it controls a blade, a brake and a clutch.

Figure 2:
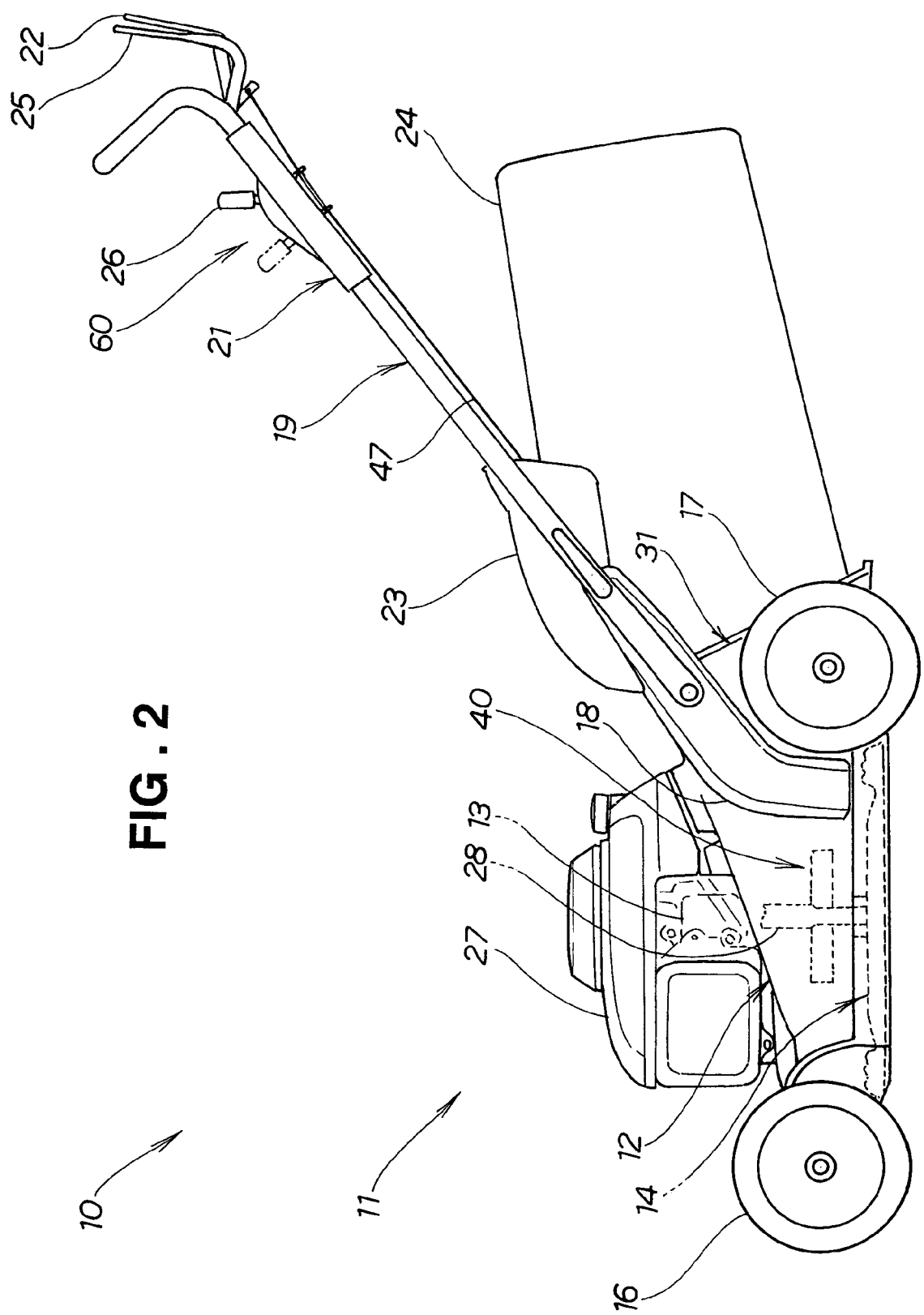
FIG. 2 is a side view of FIG. 1.

As shown in FIG. 2, the engine 13 of the lawn mower 10 is mounted on the top of the cutter housing 12. The cutter blade 14 is attached to the output shaft 28 of the engine 13 by way of a clutch mechanism 40. The left and right front wheels 16 are disposed at side faces of the front part of the cutter housing 12, and the left and right rear wheels 17 are disposed at side faces of the rear part of the cutter housing 12. Left and right handle stays 18 are attached to the side faces of the rear part of the cutter housing 12. The handle 19 extends rearward from the rear parts of these handle stays 18, 18. The clutch lever 25 is mounted on this handle 19 and controls the clutch mechanism 40. The lock lever 26 is mounted in front of the clutch lever 25 and bars an engaging function of the clutch lever. The grass bag 24 is removably attached to a rear wall face 31 of the cutter housing 12. A grass guard 23 is swingably attached to an upper part of the rear wall face 31 of the cutter housing 12.

The grass bag 24 is made of a porous material having air holes (not shown) through which the carrying draft can pass but grass cuttings cannot pass.

Figure 3:
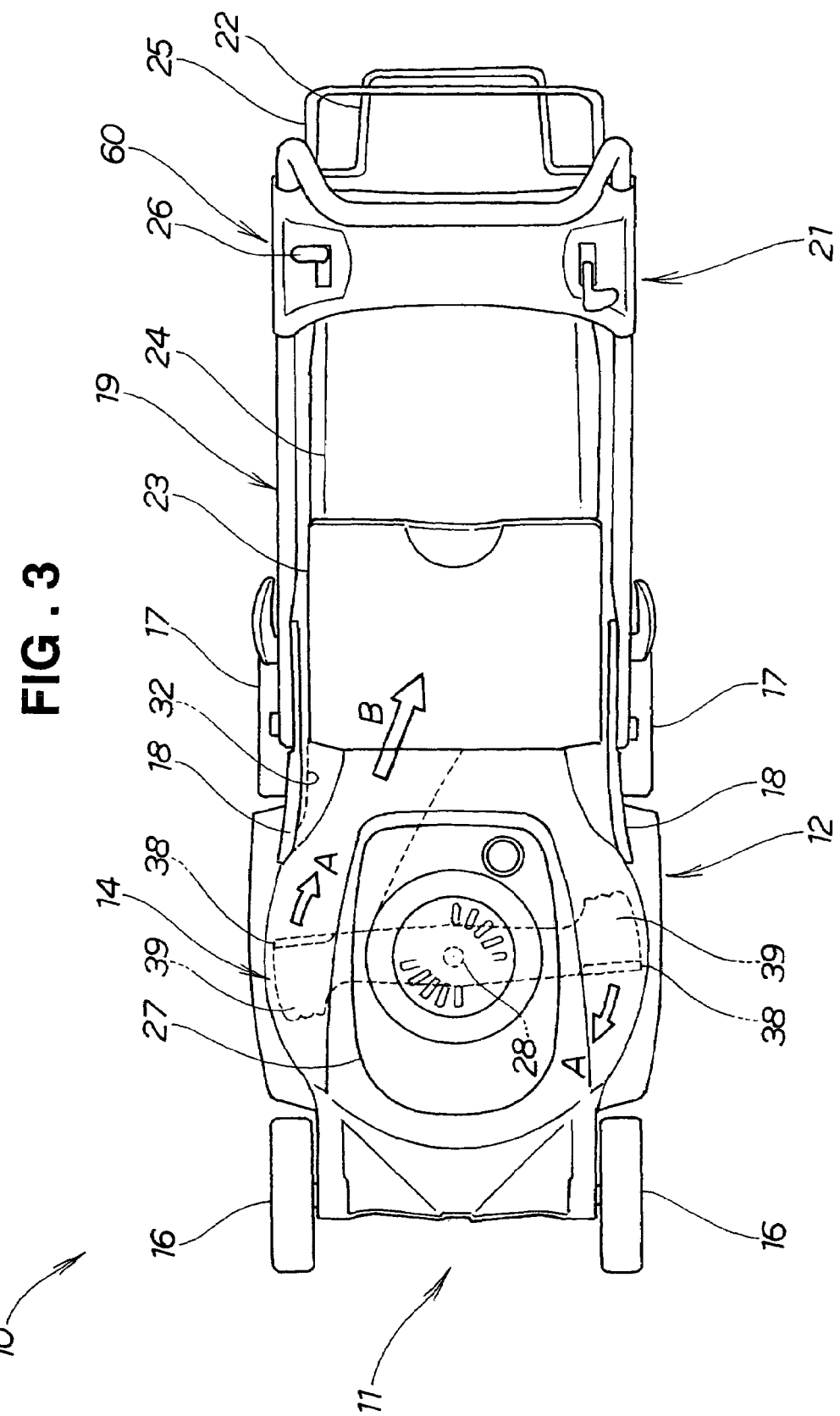
FIG. 3 is a plan view of FIG. 1.

As shown in FIG. 3, with the engine 13 (see FIG. 2) started, the clutch mechanism 40 (see FIG. 2) is switched from an off state to an engaged state by a two-stage motion of shifting the clutch lever 25 to the handle 19 side and then shifting the lock lever 26 forward, to rotate the cutter blade 14, and the clutch lever for travel 22 is shifted to the handle 19 side to rotate the rear wheels 17, 17.

The cutter blade 14 has blade parts 38, 38 on its leading sides in the rotation direction shown with the arrows A, A, and from these blade parts 38, 38 on its trailing sides in the rotation direction it has air-lifting parts 39, 39 formed so as to curve upward.

That is, as the cutter blade 14 rotates, grass on the ground surface is caused to stand up by a negative pressure arising on the undersides of the air-lifting parts 39, 39, and the grass is cut by the blade parts 38, 38. The cut grass is hit by the upper sides of the air-lifting parts 39, 39 and caught by a swirling airflow created by the rotation of the cutter blade 14, and with this swirling airflow as a carrying draft the grass cuttings are fed together with the carrying draft through a cut grass carrying passage 32 into the grass bag 24 as shown by the arrow B.

Figure 4:
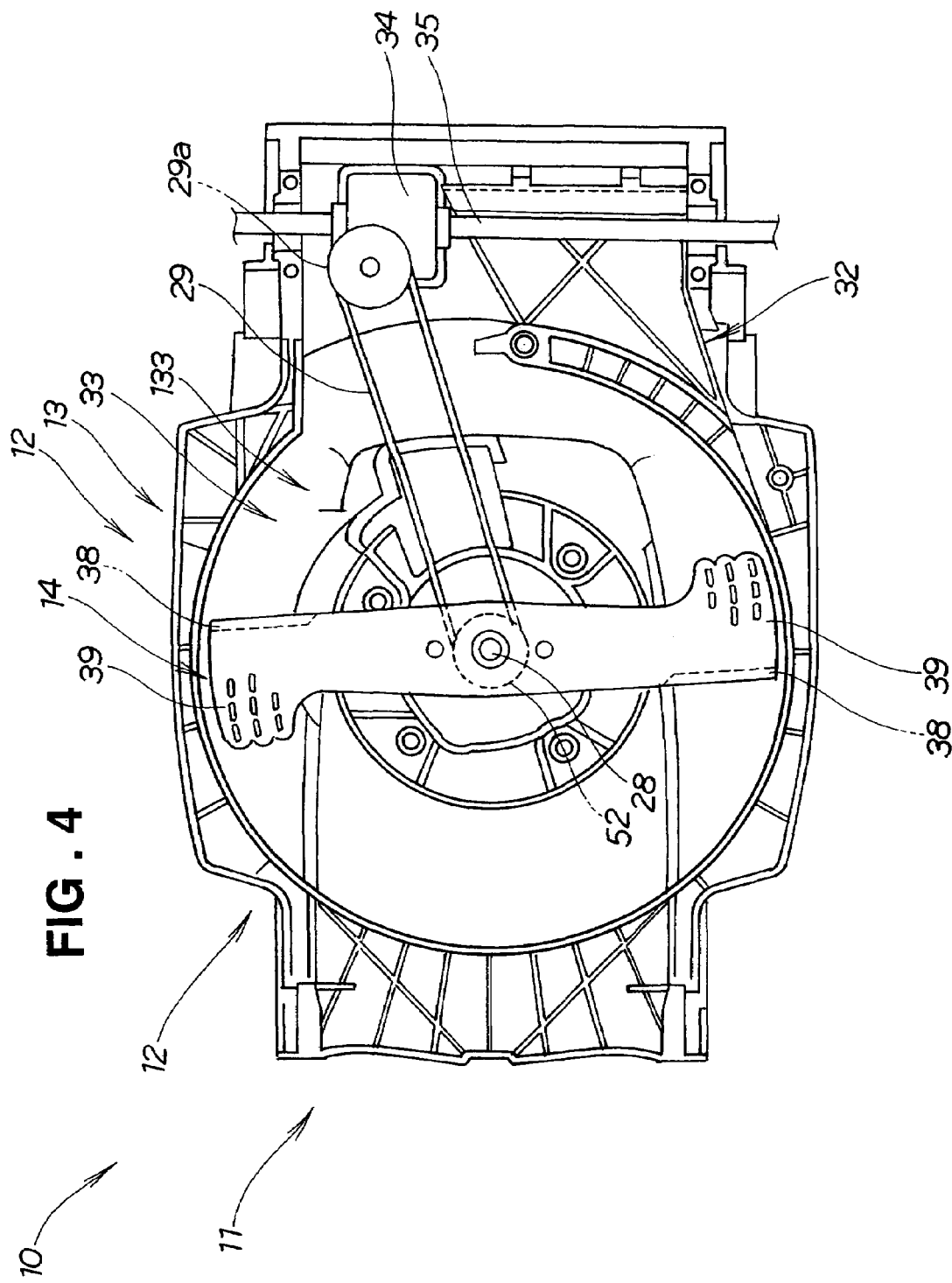
FIG. 4 is a view in the direction of the arrow 4 in FIG. 1.

FIG. 4 shows the underside of the lawn mower 10.

The cutter blade 14 is covered by the cutter housing 12. The cut grass carrying passage 32 for guiding cut grass into the grass bag 24 (see FIG. 2) is formed in the cutter housing 12. This cut grass carrying passage 32 connects with the grass bag 24.

The reference number 29 denotes a power-transmitting part (a belt); 33 a scroll part provided in the cutter housing 12 for rotatably receiving the cutter blade 14; 52 a drive pulley; 34 a clutch for travel; and 35 a rear wheel axle.

In the lawn mower 10, the output of the engine 13 is transmitted from the drive pulley 52 to a driven pulley 29a by the belt 29, and by way of the driven pulley 29a and the clutch for travel 34 the output of the engine 13 is transmitted to the rear wheel axle 35 and drives the rear wheels 17, 17 (see FIG. 3).

Figure 5:
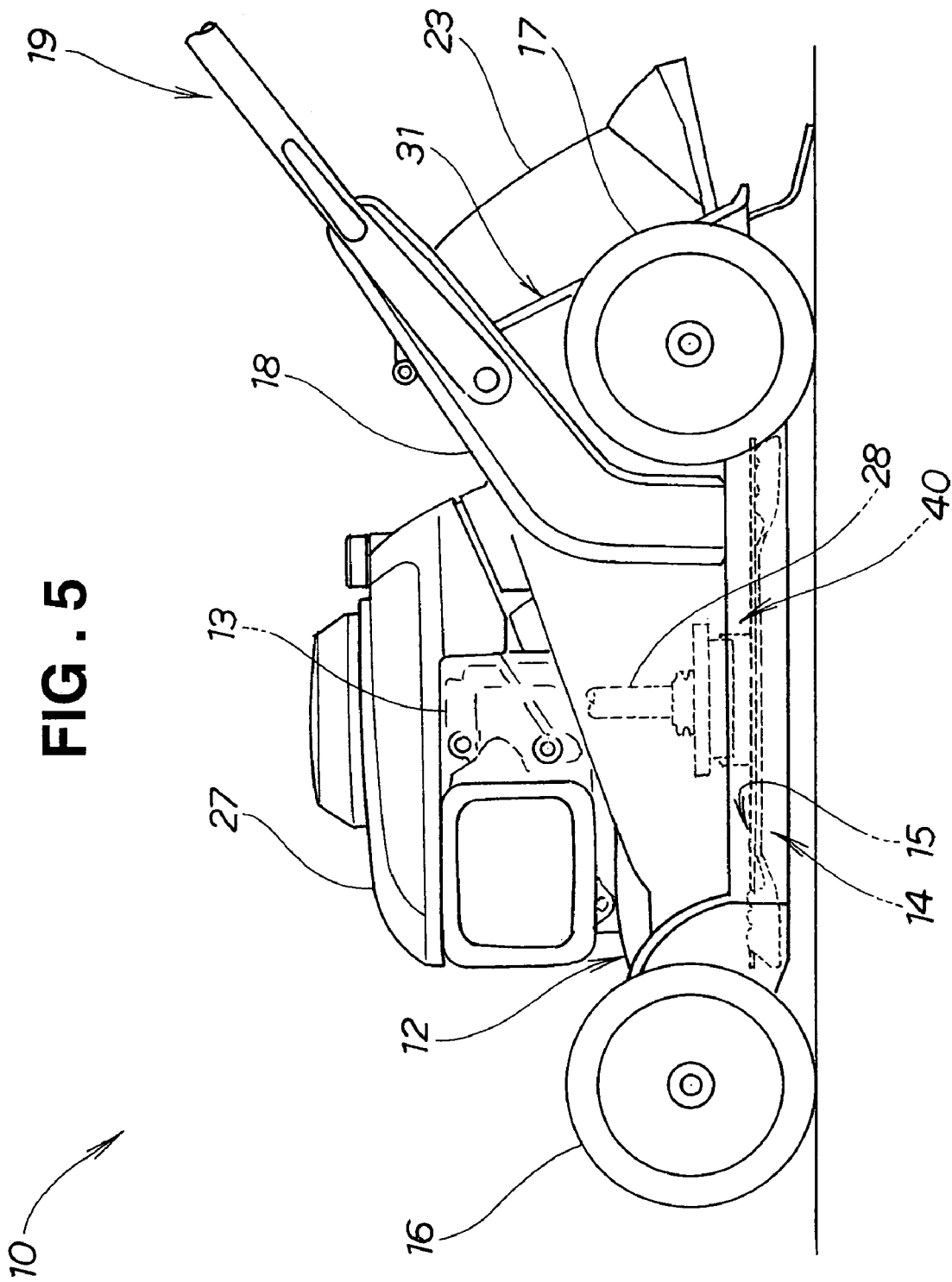
FIG. 5 is a side view showing the lawn mower shown in FIG. 1 in a mulching work state.

FIG. 5 shows a mulching work state of the lawn mower. Mulching work (mulching mode) is a working mode in which two cutter blades are provided in the cutter housing, grass is cut with these cutter blades, and finely cut grass cuttings are dispersed on the lawn surface (ground surface) so that they are inconspicuous. Mulching work is an alternative mode of discharge work, discussed below.

Discharge work (discharge mode) is a working mode in which grass is cut with one cutter blade, and the cut grass is made to pass through the cut grass carrying passage and discharged to outside through the grass cover.

Also, bagging work (bagging mode) is a working mode in which grass is cut with one cutter blade and the cut grass is made to pass through the cut grass carrying passage and collected in the grass bag.

That is, the lawn mower 10 of this preferred embodiment is capable of mulching work, discharge work and bagging work (see FIG. 2). When mulching work is to be done, an upper cutter blade 15 for mulching work is fitted to the output shaft 28 of the engine 13 along with a cutter blade 14 for discharge work and bagging work, and a dosing member (not shown) is placed in the cut grass carrying passage 32 (see FIG. 4).

Figure 6:
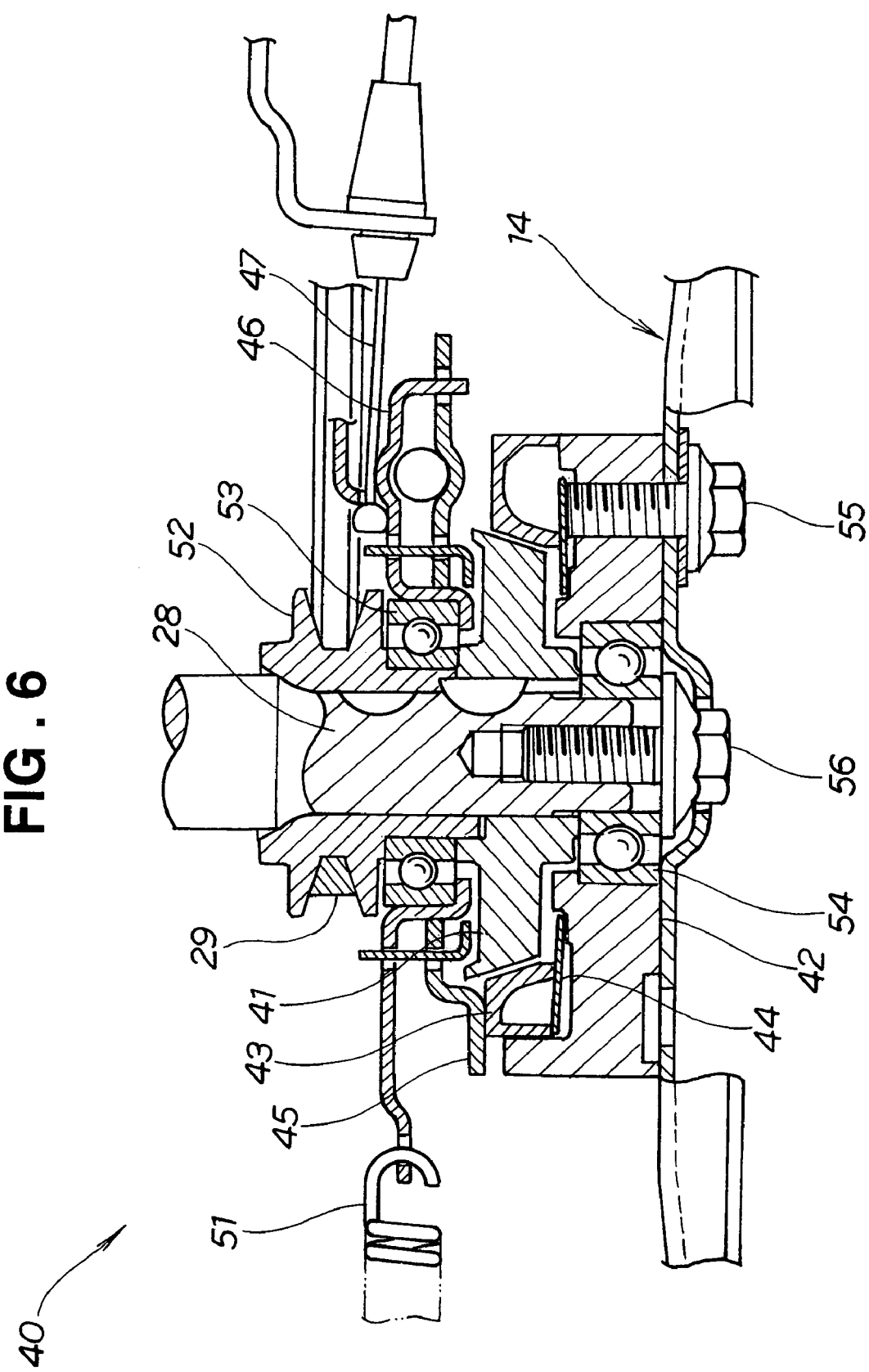
FIG. 6 is a sectional view of a clutch mechanism shown in FIG. 2.

FIG. 6 is a sectional view of the clutch mechanism 40 shown in FIG. 2.

The clutch mechanism (clutch/brake mechanism) 40 is made up of an input hub (drive-side hub) 41 mounted on the engine output shaft 28; an output hub (driven-side hub) 42, contactable with and partible from the input hub 41 and having the cutter blade 14 mounted to it; a friction plate 43, interposed between the input hub 41 and the output hub 42, that moves up and down along the axis of the output shaft 28; a plate spring 44, interposed between this friction plate 43 and the output hub 41, for urging the friction plate 43 toward the input hub 41; a brake plate 45 for separating the friction plate 43 and the input hub 41 and stopping the rotation of the friction plate 43 and the output hub 42; and an control plate 46 for raising and lowering the brake plate 45.

That is, the clutch mechanism 40 has a clutch function for connecting or cutting off the rotation of the engine 13 to/from the cutter blade 14 (see FIG. 1), and has a brake function for allowing or stopping rotation of the cutter blade 14.

Figure 8:
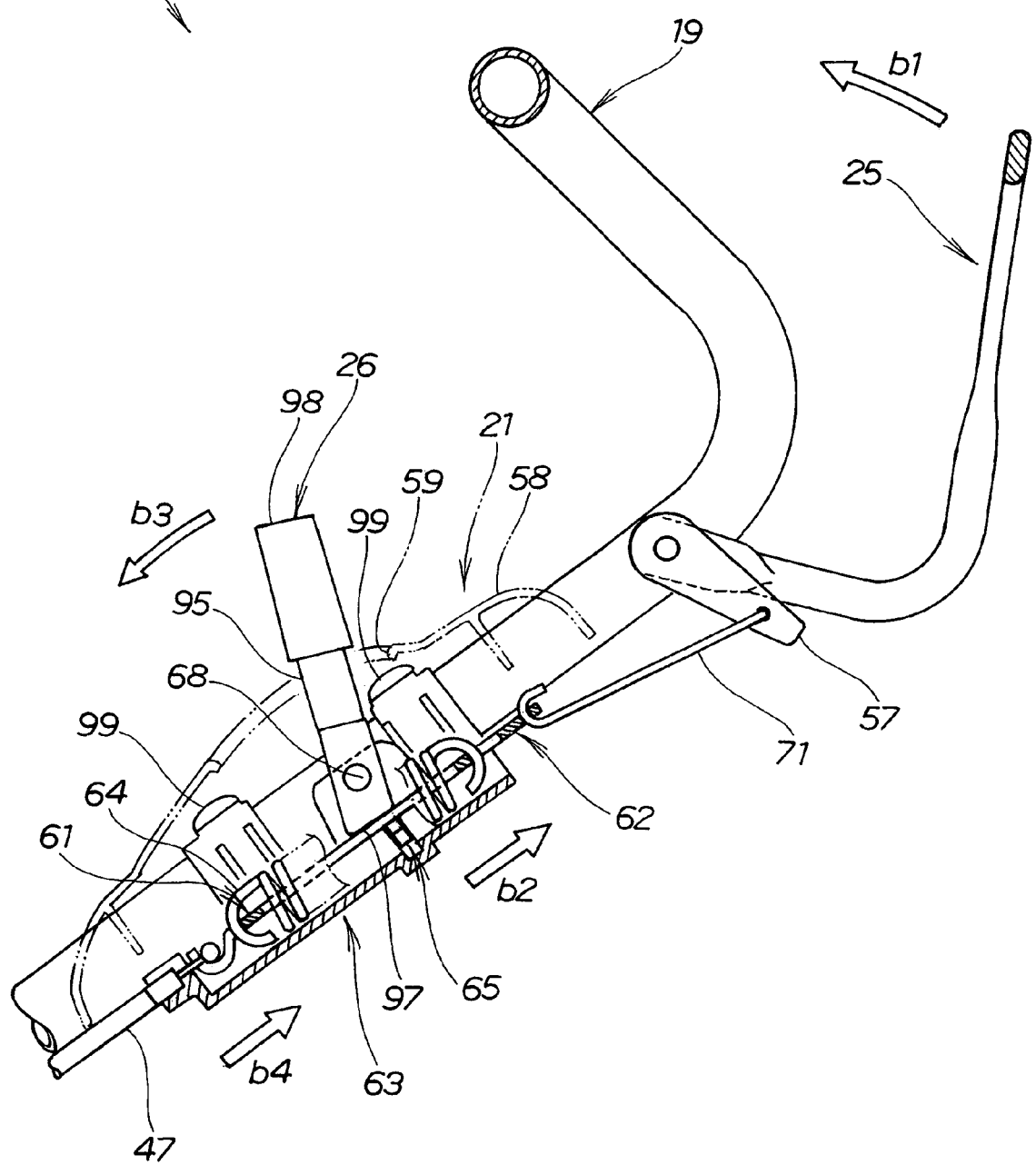
FIG. 8 is a sectional view of a part of a lock mechanism according to the invention mounted on a handle shown in FIG. 1.

One end of a cable 47 is connected to the control plate 46, the other end of the cable 47 is connected to the clutch lever 25 via the lock mechanism 60 as shown in FIG. 8, and the clutch mechanism 40 is thereby remotely controlled.

In FIG. 6, the reference number 51 denotes a coil spring attached to the control plate 46; 52 a pulley, attached to the output shaft 28, for transmitting rotation of the engine 13 to the rear wheels 17, 17 (see FIG. 3) via the motive power transmitting part 29 (see FIG. 4); 53 a bearing interposed between the output shaft 28 and the input hub 41; 54 a bearing interposed between the output hub 42 side and the control plate 46/brake plate 45; 55 a bolt for fixing the cutter blade 14 to the output hub 42; and 56 a bolt for fixing the input hub 41 and the bearings 53, 54 en bloc to the output shaft 28.

Figure 7A:
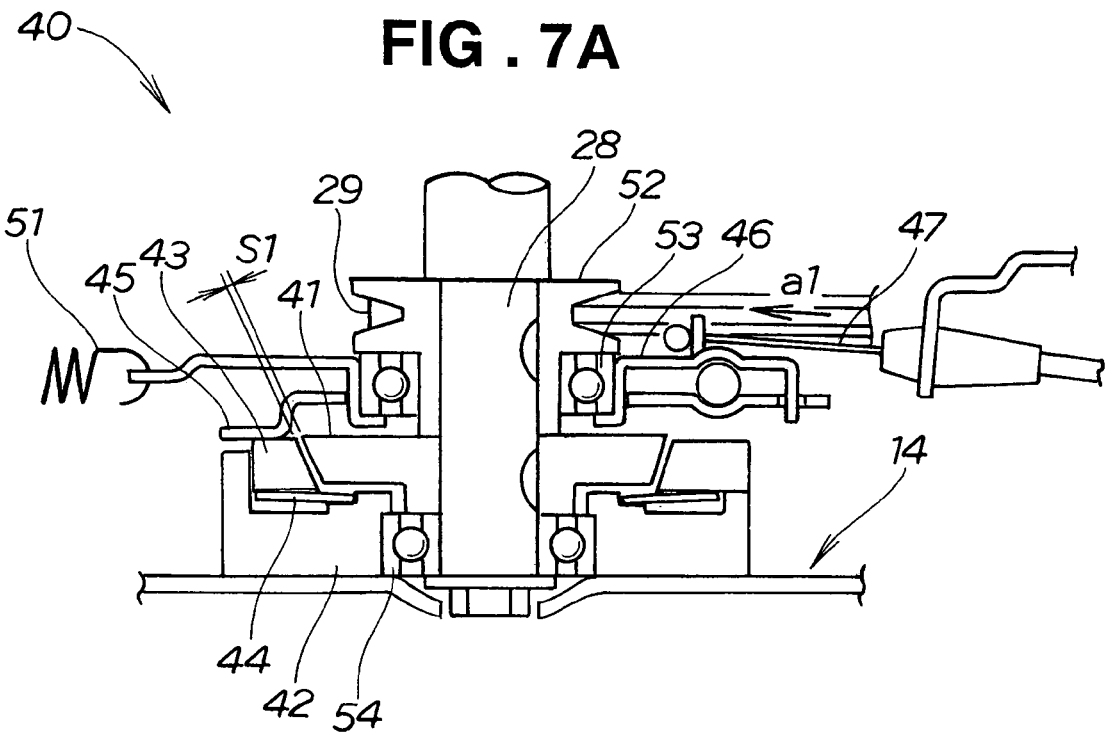
FIG. 7A and FIG. 7B are views showing movements of the clutch mechanism shown in FIG. 6.
Figure 7B:
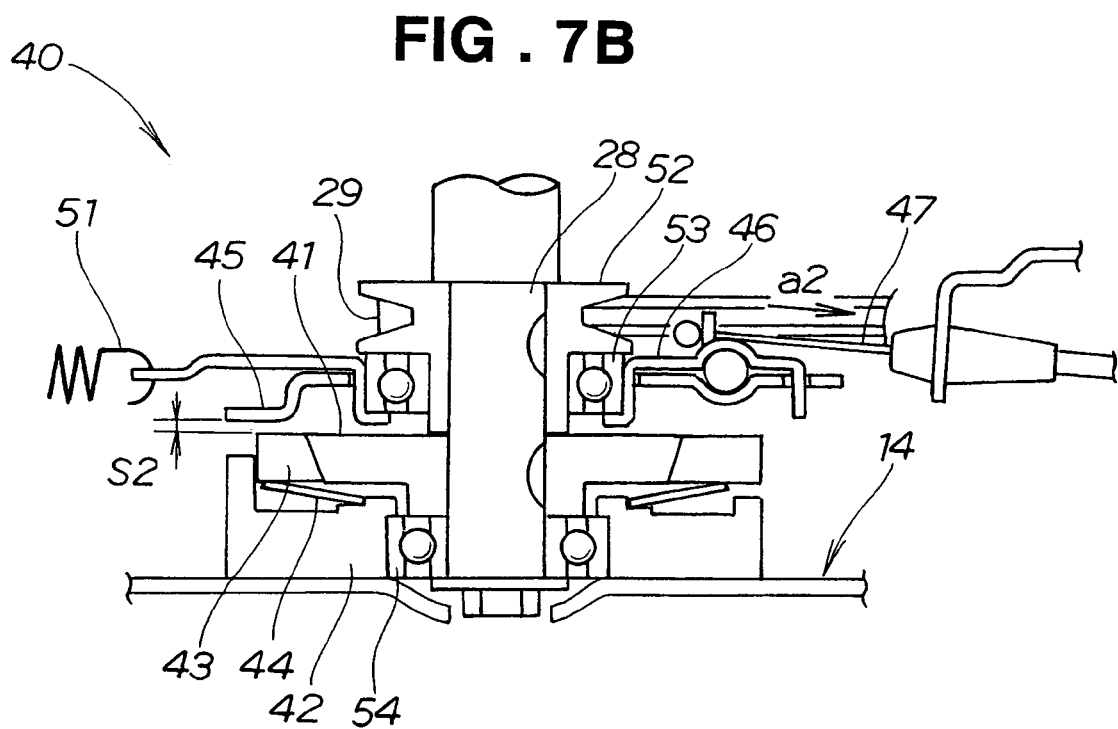

FIG. 7A and FIG. 7B illustrate the operation of the clutch mechanism 40 shown in FIG. 6, FIG. 7A showing a clutch-disengaged state and FIG. 7B showing a clutch-engaged state.

In FIG. 7A, by the cable 47 being let out as shown by the arrow a1, the friction plate 43 is pushed by the brake plate 45, this friction plate 43, the plate spring 44 and the output hub 42 are stopped and a brake is applied to the cutter blade 14, and a space S1 is created between the friction plate 43 and the input hub 41 so that the output hub 42 is isolated from the input hub 41.

In FIG. 7B, by the cable 47 being pulled as shown by the arrow a2, the brake plate 45 is released from the friction plate 43, a space S2 is created between the friction plate 43 and the brake plate 45, and the friction plate 43 is engaged with the input hub 41 and the rotation of the output shaft 28 is transmitted in order from the input hub 41 to the friction plate 43, the plate spring 44, the output hub 42 and the cutter blade 14.

FIG. 8, FIG. 9, FIG. 10 and FIG. 11 show the lock mechanism 60 for keeping the clutch lever 25 in a locked state.

As shown in FIG. 2, to keep the clutch lever 25, which remotely controls the clutch mechanism 40 by way of the cable 47, in a clutch-disengaged state, the lock mechanism 60 is disposed between the cable 47 and the clutch lever 25, on the right side of the handle 19.

The clutch lever 25 is connected to a constituent part of the lock mechanism 60 via a connecting stay part 57. A cover part 58 formed on the handle cover 21 covers the lock mechanism 60. A lock lever slot 59 is formed in the cover part 58.

When the clutch lever 25 is pivoted toward the handle 19 as shown by the arrow b1, a tension spring 64 of the lock mechanism 60 absorbs the pivoting of the clutch lever 25 by extending in the direction of the arrow b2. Consequently, the cable 47 is not pulled.

Next, by shifting the lock lever 26 forward as shown by the arrow b3, it is possible to release the lock and pull the cable 47 as shown by the arrow b4 and engage the clutch as shown in FIG. 7B.

Figure 9:
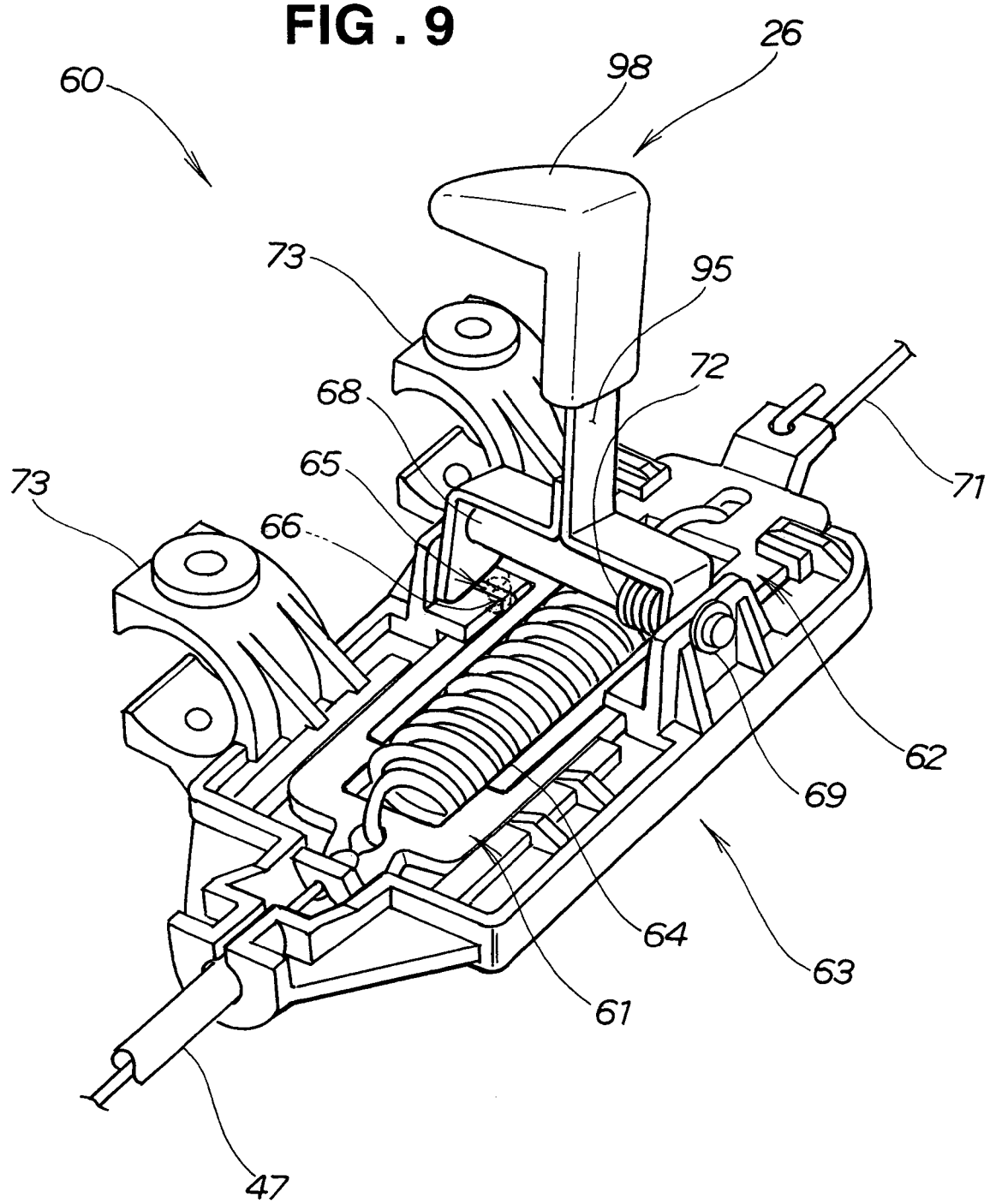
FIG. 9 is a perspective view of the lock mechanism shown in FIG. 8.

As shown in FIG. 9, the lock mechanism 60 is built into a housing 63 mounted on the right side of the handle 19 (see FIG. 8).

A first slide member 61 connected to the cable 47 is slidably received in the housing 63. A second slide member 62 connected to the clutch lever 25 (see FIG. 8) side is also slidably received in the housing 63. The tension spring 64 runs between the first and second slide members 61, 62.

Figure 10:
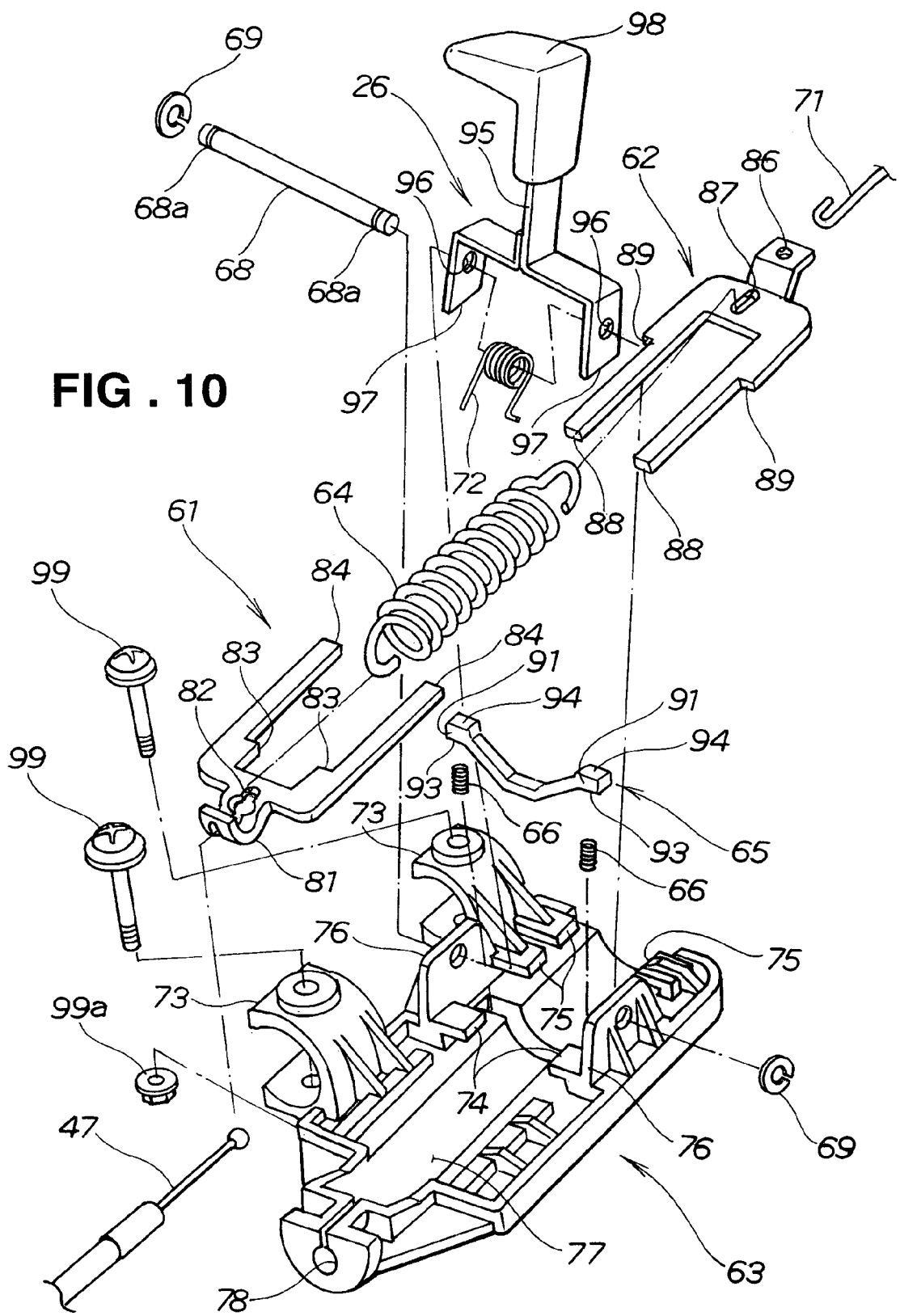
FIG. 10 is an exploded perspective view of the lock mechanism shown in FIG. 9.
Figure 11:
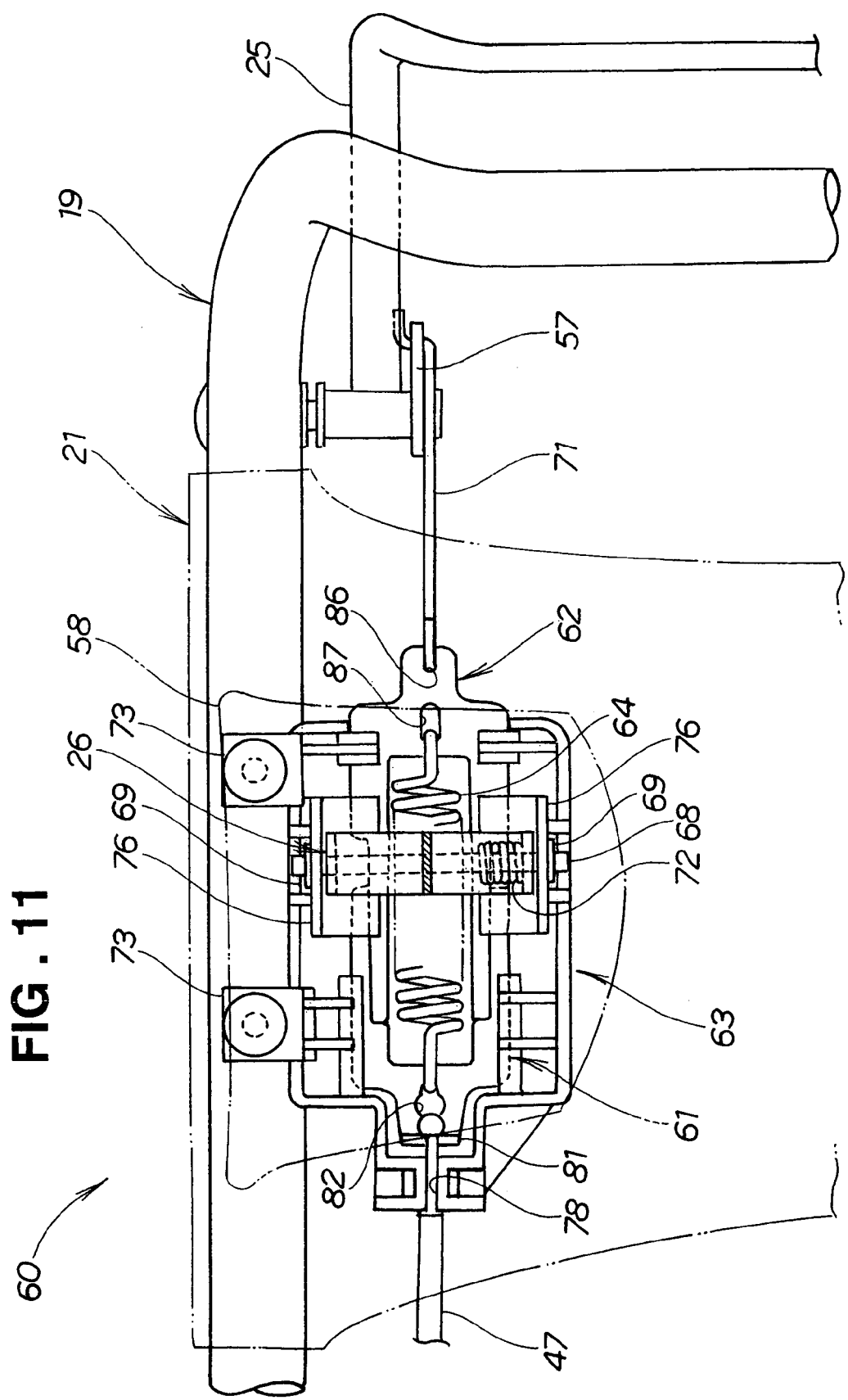
FIG. 11 is a plan view of the lock mechanism shown in FIG. 8.

As shown in FIG. 10, a catch member 65 holds in a predetermined position or releases from the predetermined position the first slide member 61. The catch member 65 is urged upward by compression springs 66, 66.

The lock lever 26 releases the first slide member 61 by pushing down the catch member 65. The lock lever 26 is pivotally supported on the housing 63 by way of a shaft 68. The shaft 68 is fastened to the housing 63 by snap rings 69, 69.

One end of a connecting wire 71 is attached to the second slide member 62. The other end of the connecting wire 71 is connected to the clutch lever 25 by the connecting stay part 57 as shown in FIG. 8.

The lock lever 26 is returnable to an initial state by a return spring 72 braced between the lock lever 26 and the housing 63.

As shown in FIG. 10, the housing 63 has a fixing stay parts 73, 73 for mounting it to the handle 19 (see FIG. 8), first guide parts 74, 74 for slidably supporting the first slide member 61, multiple second guide parts 75 for sidably supporting the second slide member 62, lever support parts 76, 76 for swingably supporting the lock lever 26, a receiving part 77 for supporting the catch member 65 in such a way that it can move up and down and receiving the compression springs, and a cable support part 78 for supporting the cable 47.

The first slide member 61 has a cable connection part 81 for the cable 47 to be connected to, a spring attachment part 82 for one end of the tension spring 64 to be hooked through, internal abutting parts 83, 83 for abutting with the second slide member 62, and external abutting parts 84, 84 for selectively abutting with the catch member 65.

The second slide member 62 has a wire connection part 86 for the connecting wire 71 to be connected to, a spring attachment part 87 for the other end of the tension spring 64 to be hooked through, internal abutting parts 88, 88 for abutting with the first slide member 61, and outer escape parts 89, 89 for clear of the catch member 65.

The catch member 65 is an approximately V-shaped stopper, and has abutting part receiving faces 91, 91 for receiving the external abutting parts 84, 84 of the first slide member 61, spring receiving faces 93, 93 for receiving the compression springs 66, 66, and engaging faces 94, 94 for engaging with the lock lever 26.

Figure 12A:
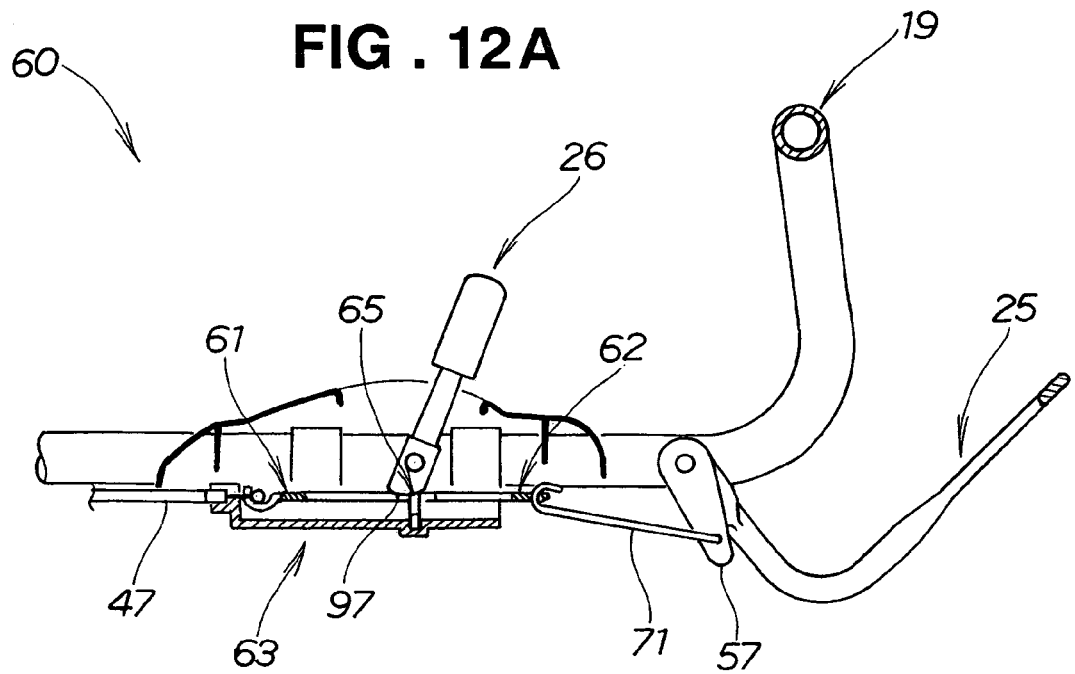
FIG. 12A and FIG. 12B are views showing the lock mechanism in a clutch-disengaged state.
Figure 12B:
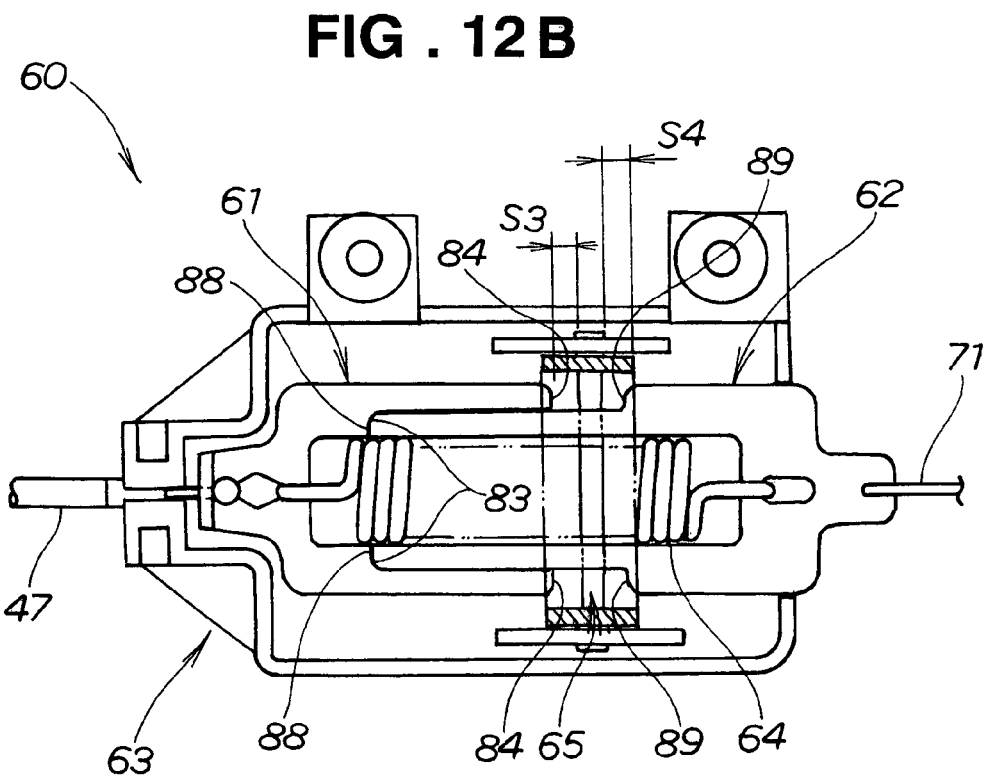

In the assembled state, as shown in FIG. 12B, which will be further discussed below, the first slide member 61 is set so that there is a space S3 between the external abutting parts 84, 84 and the abutting part receiving faces 91, 91 of the catch member 65. The second slide member 62 is set so that there is a space S4 between the outer escape parts 89, 89 and the catch member 65.

The lock lever 26 has a lever proper 95 formed in the shape of a fork, through holes 96, 96 formed in the lever proper 95 and having the shaft 68 passing through them, cam parts 97 formed on the ends of the fork of the lever proper 95 for acting on the engaging faces 94, 94 of the catch member 65, and a knob 98 covering the lever proper 95.

The shaft 68 has fitting grooves 68a, 68a in which the snap rings 69, 69 fit.

In FIG. 10, the reference numbers 99, 99 denote fixing screws for fixing the housing 63 to the handle 19, and 99a denotes nuts for the fixing screws 99, 99.

Next, the operation of the lock mechanism 60 when the clutch is engaged and disengaged will be explained, on the basis of FIG. 12A to FIG. 15B.

FIG. 12A and FIG. 12B show the state of the lock mechanism when the clutch is in its disengaged (OFF) state.

In FIG. 12A, the clutch lever 25 and the lock lever 26 are both in a released state (initial state). The catch member 65 of the lock mechanism 60 is in a raised position. The engine 13 (see FIG. 1) is running, but the rear wheels 17, 17 and the cutter blade 14 shown in FIG. 3 are stopped.

In FIG. 12B, the space S3 is provided between the external abutting parts 84, 84 of the first slide member 61 and the catch member 65. The space S4 is provided between the outer escape parts 89, 89 of the second slide member 62 and the catch member 65. And the internal abutting parts 83, 83 of the first slide member 61 and the internal abutting parts 88, 88 of the second slide member 62 are in abutment.

Figure 13A:
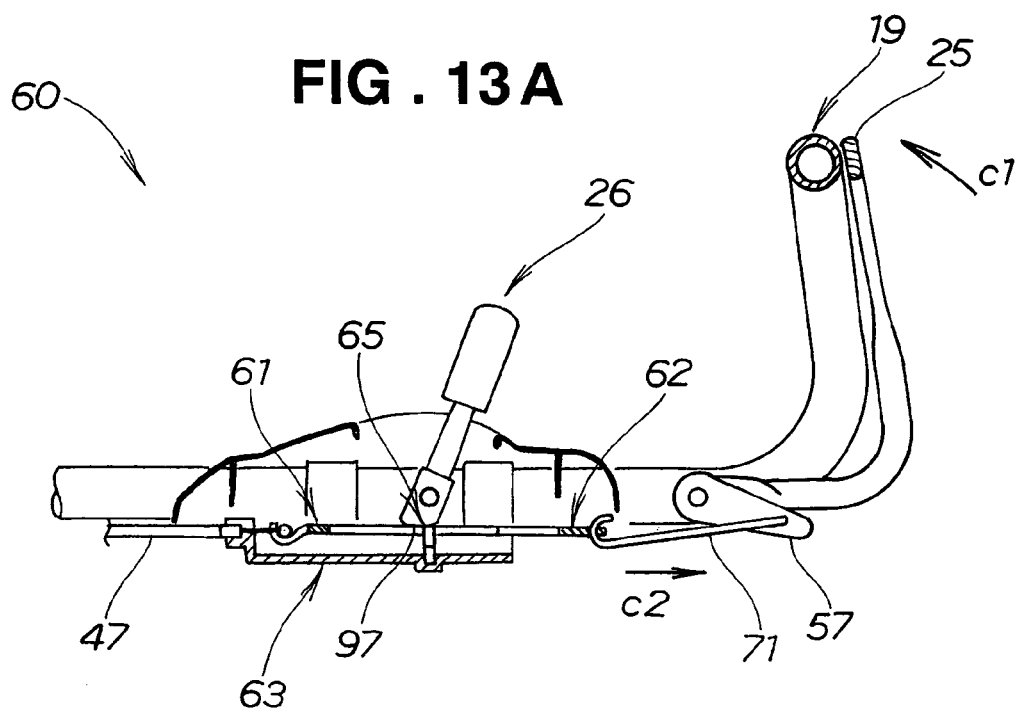
FIG. 13A and FIG. 13B are views showing the lock mechanism with a clutch lever being operated.
Figure 13B:
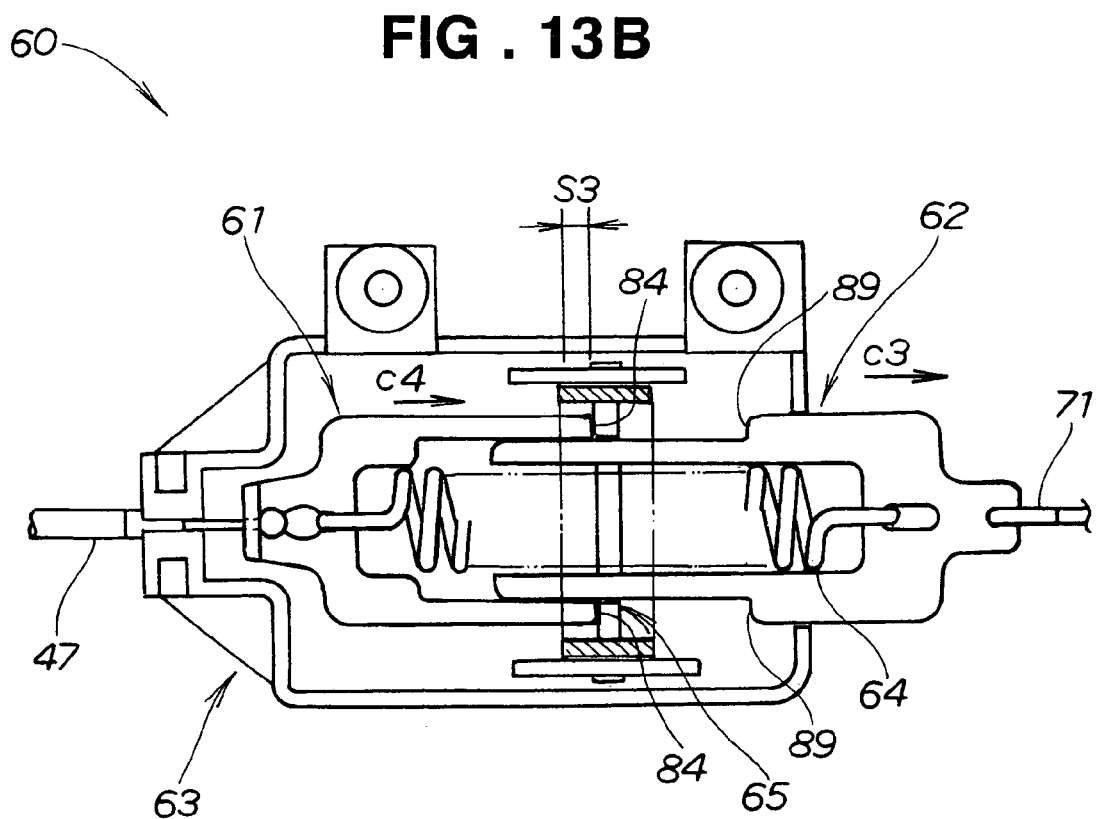

FIG. 13A and FIG. 13B show the clutch lever 25 having been operated.

As shown in FIG. 13A, the clutch lever 25 is pivoted toward the handle 19 as shown by the arrow c1 and pulls the connecting wire 71 as shown by the arrow c2. In this state, as in FIG. 12A, the engine 13 (see FIG. 1) is running and the rear wheels 17, 17 and the cutter blade 14 are stopped.

As shown in FIG. 12B, the second slide member 62 moves as shown by the arrow c3 and the tension spring 64 extends. As a result, the first slide member 61 moves by the amount of the space S3 as shown by the arrow c4. The external abutting parts 84, 84 of the first slide member 61 abut with the abutting part receiving faces 91, 91 (see FIG. 10) of the catch member 65, and the first slide member 61 stops. Because the first slide member 61 only moves by the amount of the space S3 like this, the clutch mechanism 40 (see FIG. 6) does not engage. That is, the disengaged state of the clutch mechanism 40 is maintained.

Figure 14A:
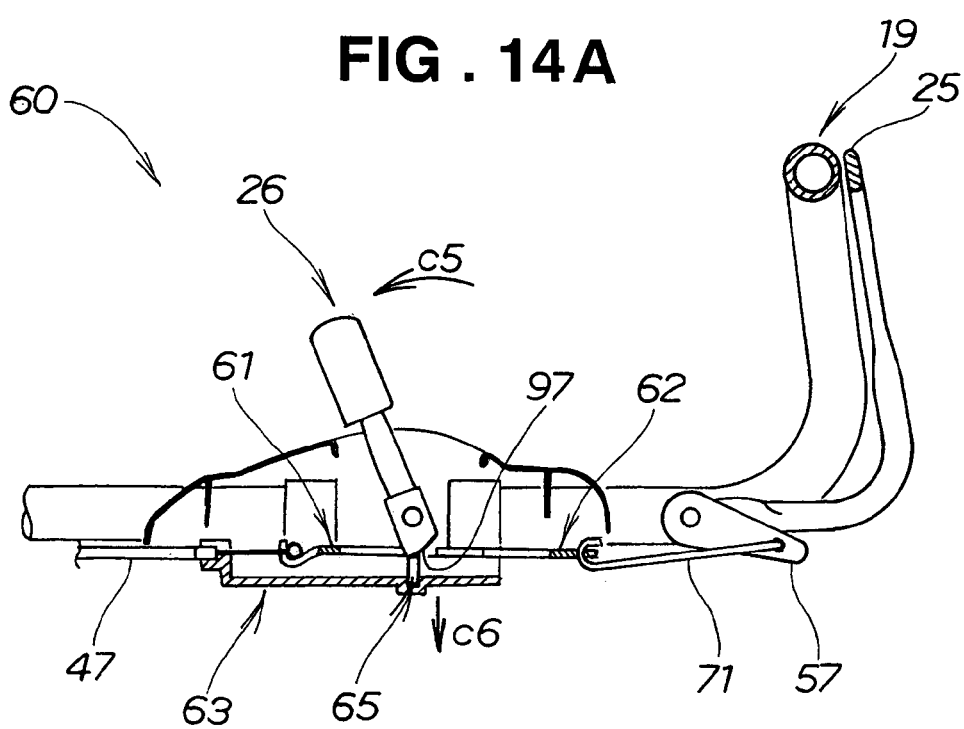
FIG. 14A and FIG. 14B are views showing the lock mechanism with a lock lever shifted forward.
Figure 14B:
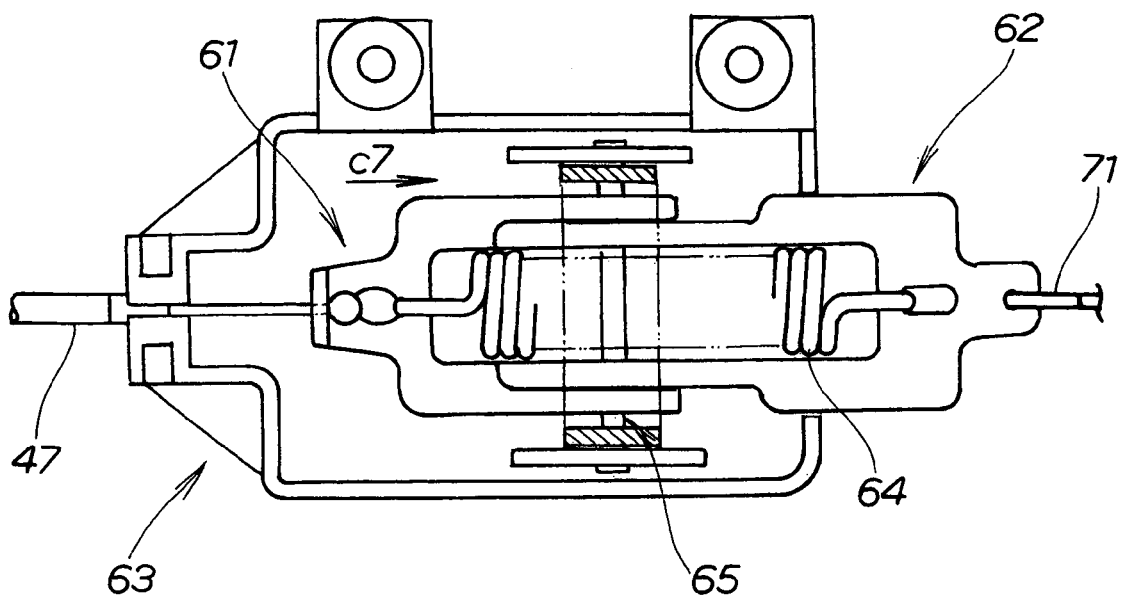

FIG. 14A and FIG. 14B show the lock lever 26 having been shifted forward.

In FIG. 14A, by the lock lever 26 being shifted forward as shown by the arrow c5, the catch member 65 is pushed down by the cam parts 97 as shown by the arrow c6, releasing the first slide member 61 from the catch member 65. That is, by the two-motion control operation of the operation of the clutch lever 25 shown in FIG. 13A and the operation of the lock lever 26 shown in FIG. 14A, the clutch mechanism 40 (see FIG. 6) is switched from its disengaged state to its engaged state, and the cutter blade 14 (see FIG. 2) rotates.

Two-motion control operation refers to the control operation by which engaging or disengaging of the clutch mechanism 40 is effected using the combination of the two control members that are the clutch lever 25 and the lock lever 26.

As a result of the operation of the lock lever 26, as shown in FIG. 14B, the first slide member 61 moves under the pulling force of the tension spring 64 as shown by the arrow c7. The cable 47 is pulled, and the clutch mechanism 40 (see FIG. 7) switches over instantaneously from its disengaged state to its engaged state.

As a result, it is possible to eliminate the action of a half-clutch state being continued for a long time when the clutch lever 25 shown in FIG. 14A is moved toward the handle 19. Therefore, wear of the clutch mechanism 40 is prevented, and the life of the clutch mechanism 40 is extended. Also, the production of extraneous noise on engagement of the clutch mechanism 40 is suppressed, and burning of the clutch mechanism 40 is prevented and a drop in transmitted power is prevented.

That is, under the pulling force of the tension spring 64 the clutch mechanism 40 (see FIG. 7) is engaged instantaneously, and mowing work can be started swiftly.

Also, because the first and second slide members 61, 62 move rectilinearly, there little deterioration of the cable 47. Accordingly, it can be said that the lock mechanism 60 is a highly durable mechanism that uses a simple movement.

Figure 15A:
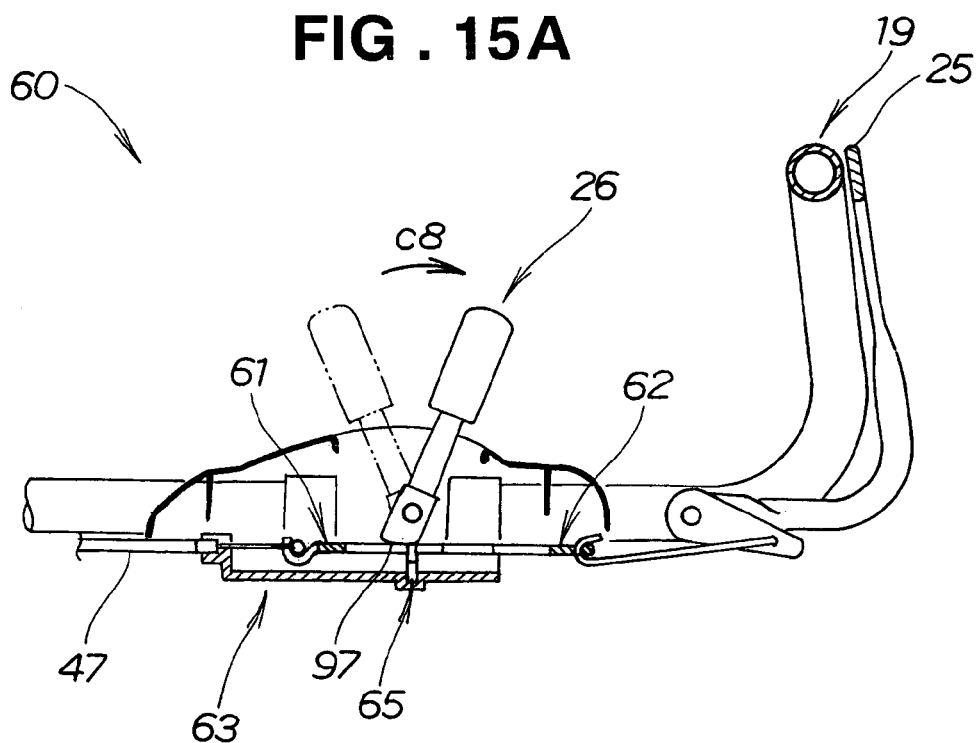
FIG. 15A and FIG. 15B are views showing the lock mechanism with a hand having been removed from the lock lever and the lock lever having returned.
Figure 15B:
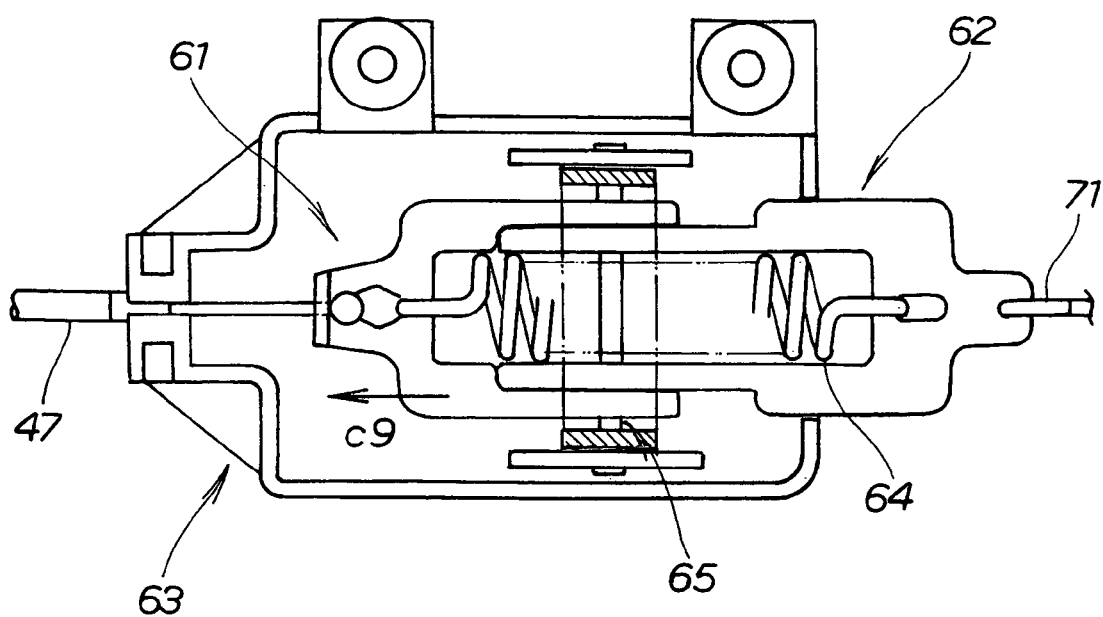
Figure 16:
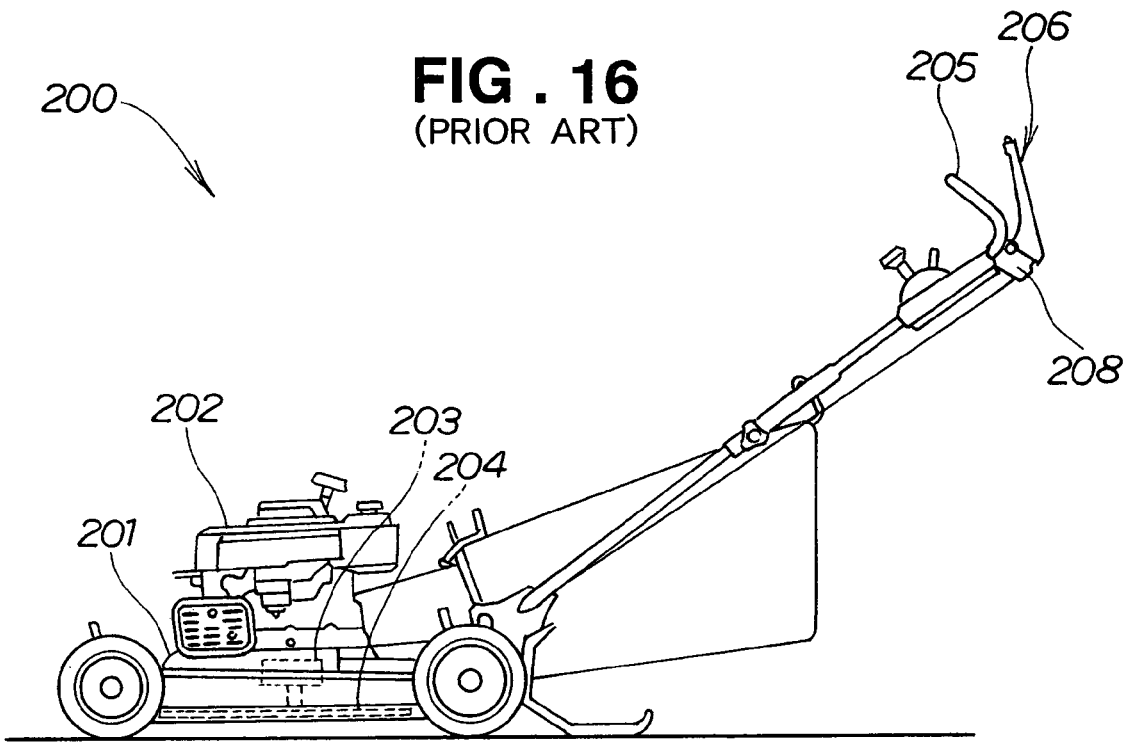
FIG. 16 is a side view showing a lawn mower of related art.
Figure 17:
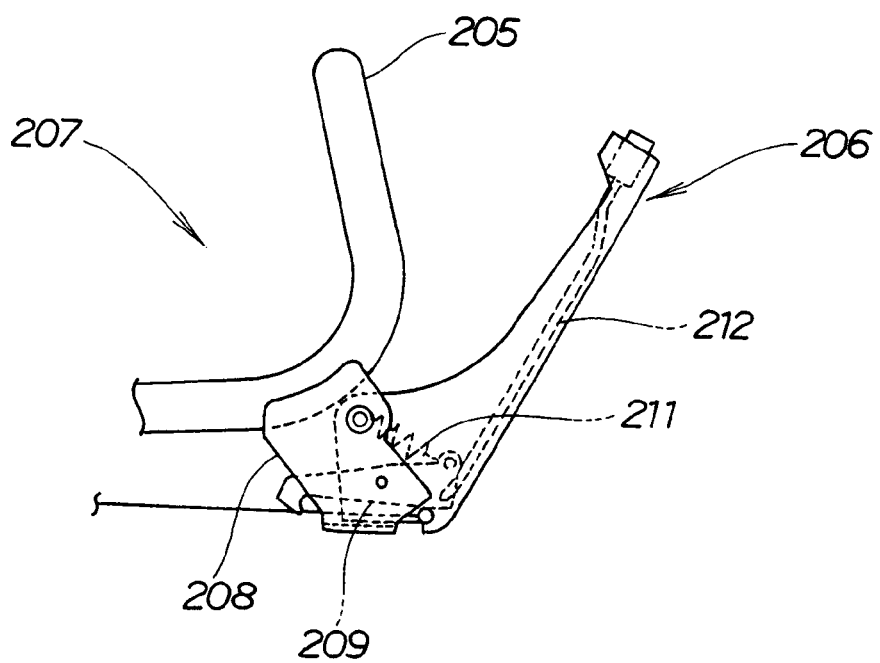
FIG. 17 is a view showing a lock mechanism employed in the lawn mower shown in FIG. 16.

FIG. 15A and FIG. 15B show the lock lever 26 in its returned state.

As shown in FIG. 15A, when a hand is removed from the lock lever 26, under the elastic action of the return spring 72 (see FIG. 10) interposed between the lock lever 26 and the housing 63, the lock lever 26 returns automatically to its initial state as shown by the arrow c8. In this state, when the clutch lever for travel 22 (see FIG. 2) is shifted toward the handle 19, power from the engine 13 is transmitted to the rear wheels 17, 17 and the lawn mower 10 starts mowing work while propelling itself forward.

In FIG. 15B, because the engaging faces 94, 94 (see FIG. 10) of the catch member 65 are in abutment with the underside of the first slide member 61, when a hand is removed from the clutch lever 25 shown in FIG. 15A, as shown by the arrow c9 the cable 47, the first slide member 61, the tension spring 64, the second slide member 62 and the connecting wire 71 return to their initial state.

Although in this preferred embodiment an example has been shown in which the cam parts 97 are formed integrally with the lock lever 26, there is no limitation to this, and alternatively the cam parts may be provided as a cam member separately from the lock lever.

Obviously, various minor changes and modifications of the present invention are possible in the light of the above teaching. It is therefore to be understood that within the scope of the appended claims the invention may be practiced otherwise than as specifically described.

What is claimed is:

1. A lawn mower comprising:
   a cutter blade for cutting grass;
   a clutch mechanism for transmitting or cutting off motive power to the cutter blade from an engine;
   a clutch lever for remotely controlling the lawn mower by way of a cable; and
   a lock mechanism for barring a clutch-engaging function of the clutch lever,
   wherein the lock mechanism is interposed between the cable and the clutch lever and comprises a first slide member connected to the cable side, a second slide member connected to the clutch lever side, a tension spring interposed between the first and second slide members, a catch member for holding in a predetermined position or releasing from the predetermined position the first slide member, a cam member for moving the catch member, and a lock lever for actuating the cam member.

2. A lawn mower according to claim 1, wherein the cam member consists of a cam part formed integrally with the lock lever.

* * * * *